United States Patent [19]

Parish

[11] Patent Number: 4,723,929

[45] Date of Patent: Feb. 9, 1988

[54] INFLATABLE LIFE RAFTS

[75] Inventor: James M. Parish, Wadsworth, Ohio

[73] Assignee: The B. F. Goodrich Company, Akron, Ohio

[21] Appl. No.: 50,610

[22] Filed: May 18, 1987

[51] Int. Cl.$^4$ ............................................. B63B 35/58
[52] U.S. Cl. ..................... 441/39; 114/362; 141/382; 182/48; 244/905
[58] Field of Search ................. 114/345, 362; 441/30, 441/31, 39, 40, 41; 52/2 R, 2 H; 141/382; 182/48; 193/25 B; 244/905

[56] References Cited

U.S. PATENT DOCUMENTS

| 3,463,287 | 8/1969 | Smith | 193/25 B |
| 4,460,062 | 7/1984 | Fisher | 182/48 |
| 4,678,443 | 7/1987 | Edwards et al. | 441/40 |

FOREIGN PATENT DOCUMENTS 1538084  1/1979  United Kingdom ................ 244/905

Primary Examiner—Sherman D. Basinger
Assistant Examiner—Thomas J. Brahan
Attorney, Agent, or Firm—Joseph Januszkiewicz

[57] ABSTRACT

An improved life raft with inflatable tubes having a boarding ramp attached to such raft wherein the raft is inflated by a hose interconnected by a coupling means and via a second hose to the raft such that the pressurized life raft chamber inflates the boarding ramp. The coupling means is a quick disconnect coupling means which in a connected condition is operative to main a flow connection between hoses and chambers but in a disconnected condition is operative to block the flow connection from both hoses and their respective chambers. A tension member is used to interconnect the quick disconnect coupling means to the raft and provides the means for disconnecting the coupling means when sufficient tension is provided as extending the distance between the coupling means and the raft. Such coupling means with the tension member can also be installed between the main inflating cylinder and the raft.

11 Claims, 5 Drawing Figures

INFLATABLE LIFE RAFTS

BACKGROUND OF THE INVENTION

This invention relates to inflatable life rafts and more particularly to a new and improved life raft with an inflatable boarding ramp with a connector therebetween.

Inflatable life rafts are generally compulsory equipment on certain sea-going vessels as well as aircraft because of their unique advantage that they can be stowed in an exceedingly small space and then deployed in a matter of seconds under adverse condition. It is important in the deployment of these inflatable rafts that means be provided to facilitate their boarding and accessibility by personnel from the waters which is not necessarily done under ideal conditions. To accommodate such boarding, life rafts have employed ramps that are attached to the inflatable raft but at a lower level than the side walls of the raft. In the process of inflating such rafts, which are generally composed of a plurality of circular tubes stacked and suitably connected together, the tube chambers are generally connected to a common gas source or charged cylinder to facilitate their inflating. With the placement or attachment of the ramp to the raft, it has been necessary to inflate the ramp from the chamber of the raft tube or tubes since the ramp chamber is generally of a much lesser volume. When the raft is in use, the connection between the raft tubes and the ramp was considered permanent or non-detachable. As the raft in rough sea conditions could undergo unusual stresses, a tube in the boarding ramp could be punctured and the boarding ramp and the chamber (lower set of tubes in the raft) supplying air to such ramp would deflate leaving the raft with only half of its buoyancy or load carrying capacity. The present invention provides the new concept of interconnecting the ramp chambers with the raft chambers that supply the air inflating means for the ramp with a disconnect coupling therebetween which closes off the respective chambers to prevent deflation of the air supplying chamber from the raft without jeopardizing its integrity or reducing its full carrying capacity. Such action disconnects or isolates the raft chambers from the ramp chamber before any failure occurs, thus pressure will be maintained in one chamber (for example the lower tube or tubes of the raft) if the other chamber (ramp tubes) is punctured. The present invention utilizes standard available hardware which makes the assembly unique in that it can be readily made, repaired and maintained.

SUMMARY OF THE INVENTION

The present invention contemplates a life raft composed of inflatable tubes that make up the sides of the raft that are cooperative with a floor to define a boat-like structure. An inflatable boarding ramp attached to the raft has their chambers interconnected by hoses via a quick disconnect coupling means which in its connected condition is operative to maintain the hoses and chambers interconnected for the flow of pressurized gas but in the unconnected or disconnected condition is operative to maintain the hoses blocked so that the chambers cannot lose pressurized gas via their hoses. A tension member is used to interconnect the quick disconnect coupling means to the raft and provides the means for disconnecting the quick disconnect coupling means when sufficient tension is provided thereon as extending the distance between the coupling means and the raft beyond a predetermined distance. Such quick disconnect coupling means can also be installed between the pressurizing cylinder for the raft chamber and the raft chamber, with the tension member operative in the same manner as between the boarding ramp and raft.

DETAILED DESCRIPTION

Figure 1:
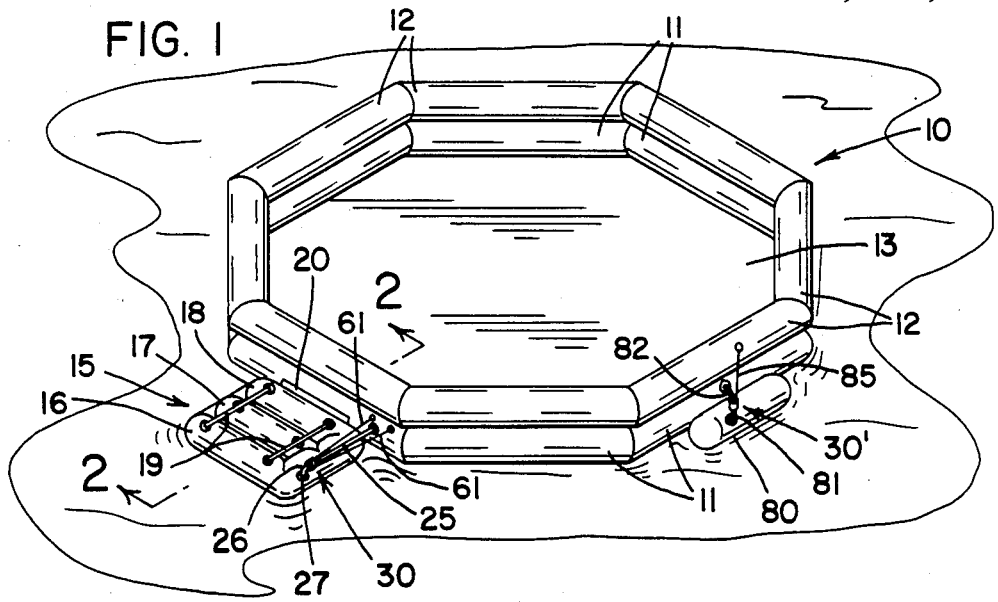
FIG. 1 is a perspective diagrammatic view of a life raft and boarding ramp.
Figure 2:
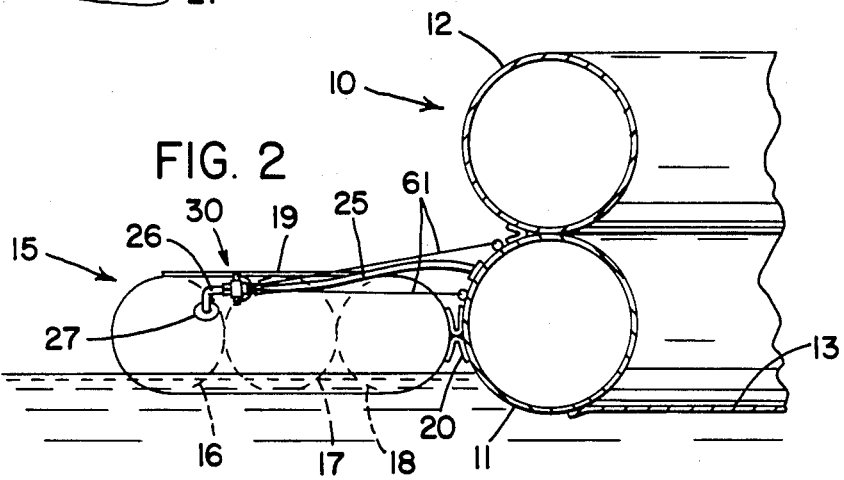
FIG. 2 is a cross sectional view of the raft and boarding ramp taken on line 2—2 of FIG. 1.

Referring now to the drawings, wherein like reference numerals designate like or corresponding parts throughout the several views, there is shown in FIGS. 1 and 2 an inflatable life raft 10 comprising a lower set of inflatable tubes 11 suitably bonded to an upper set of inflatable tubes 12 and holding them apart in a circumferential loop when inflated. The respective upper set of tubes 12 and lower set of tubes 11 communicate with one another through a common gas source so that all tubes of the assembly or life raft can be inflated simultaneously when the life raft 10 is required to be projected from its stowage in an emergency. The life raft 10 has a lower panel member 13 that has its entire periphery suitably bonded to the lower or bottom surface of the lower set of tubes 11 to form the bottom surface of the life raft 10.

A suitable source of pressurized air or gas as a container or bottle of compressed gas is mounted on the side or underside of the raft which in turn is connected via suitable conduits and valve means to inflate the upper and lower tubes 11 and 12 in a manner old and well known in the art.

To facilitate the boarding of the raft 10 from the water by those to be rescued, an inflatable boarding ramp 15 consisting of three inflatable tubes 16, 17 and 18 are connected as by patches 20 bonded to the respective sides of tube 18 and an adjacent lower tube 11 as seen in FIG. 2.

The tubes 16, 17 and 18 of ramp 15 are of smaller diameter than raft tubes 11 or 12 to accommodate their use as a boarding device to the adjacent vertically stacked tubes 11 and 12.

Boarding ramp 15 consisting of such tubes 16, 17 and 18 may have such tubes as separate distinct tubes, all intercommunicating with each other to define in effect a single inflatable chamber for the ramp or may have such plural tubes made from a pair of panels bonded along the intersection of tubes 16 and 17 and bonded along tubes 17 and 18 as by using tapes. The tubes 16, 17 and 18 are suitably reinforced along the periphery of the panels or tubes.

Two webbing straps 19 as shown in FIG. 1 may be bonded to the respective sides of the ramp to help maintain the integrity of the boarding ramp unit and can be used as handles during boarding.

A hose 25 via a fitting on one end is connected to the upper portion of one of the tubes 11 adjacent to the boarding ramp 15.

Tube 16 of boarding ramp 15 has a flexible hose or a rigid elbow-shaped hose 26 connected to it via a hose attachment fitting 27. A quick disconnect shut-off coupling 30 interconnects the respective hpses 25 and 26.

Coupling 30 is composed of a socket 31 connected via an internally threaded end portion 32 to a threaded end 33 of hose 25. Coupling 30 also has a plug 35 connected via an internally threaded end portion 36 to a threaded end 37 of hose 26. As seen in FIG. 5 the respective plug 35 and socket 31 of coupling 30 are shown disconnected whereas FIG. 4 shows the plug 35 engaged with socket 31.

Socket 31 has a stepped bore with an enlarged opening or bore portion 40, a reduced portion 41 with an intermediate frusto-conical bore 42 that tapers from bore portion 41 radially inwardly towards the axis of such bore 41 defining a valve seat 42. The enlarged opening or bore portion 40 has a shoulder 45 that terminates at the radially innermost reduced portion of frusto-conical bore 42. Enlarged bore portion 40 has a recessed ring that receives an O-ring 46. A sleeve 48 with a recessed portion 49 is slidably received by the socket 31. Socket 31 has an annular shoulder 50 against which a spiral spring 51 is seated. The spring 51 biases the sleeve 48 axially away from the hose 25. The external body of socket 31 adjacent to the forwardmost portion thereof is recessed to receive an annular seal 52, which as seen in FIG. 4 limits the axial movement of sleeve 48 as biased by spring 51. Such forward body portion of socket 31 has a plurality of circumferentially spaced bores 55, receiving stainless steel balls 56 suitably hardened to operate as a locking mechanism. The intermediate external socket 31 has an annular recess to receive a circular ring 58 which in turn has a pair of spaced lugs 59 receiving an arcuate clip 60 connected by tension lines or cords 61—61 to loop patches on tube 11.

Located within bore 41 is a valve 65 having a frusto-conical forward portion 66 with an annular sealing ring 67 seated on the valve seat 42. The valve 65 has a central recess receiving a spring 68 suitably seated on a stem 69 to bias valve 65 in a leftward direction as viewed in FIG. 5 to seat sealing ring 67 on the valve seat 42 and prevent any pressurized fluid from hose 25 flowing past valve 65 into central bore 40.

Figure 4:
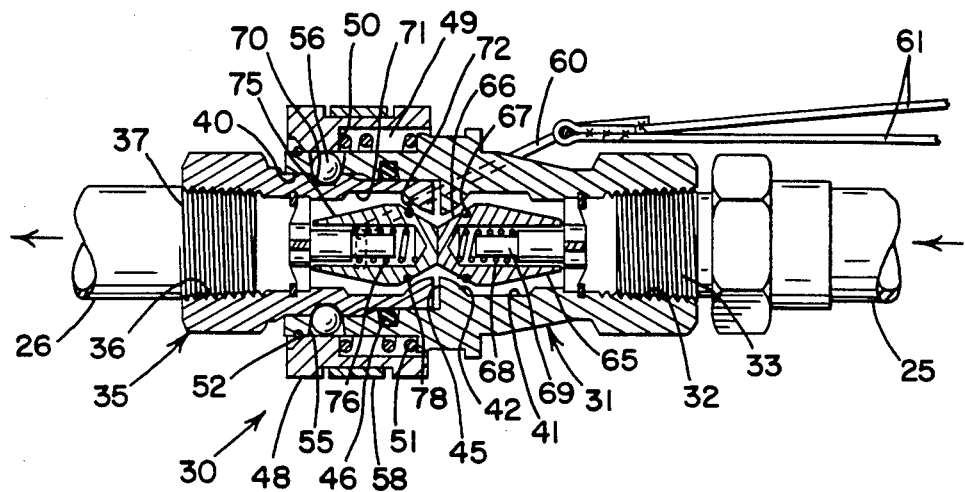
FIG. 4 is a cross sectional view of a quick disconnect coupling means in an operative and engaged condition.
Figure 5:
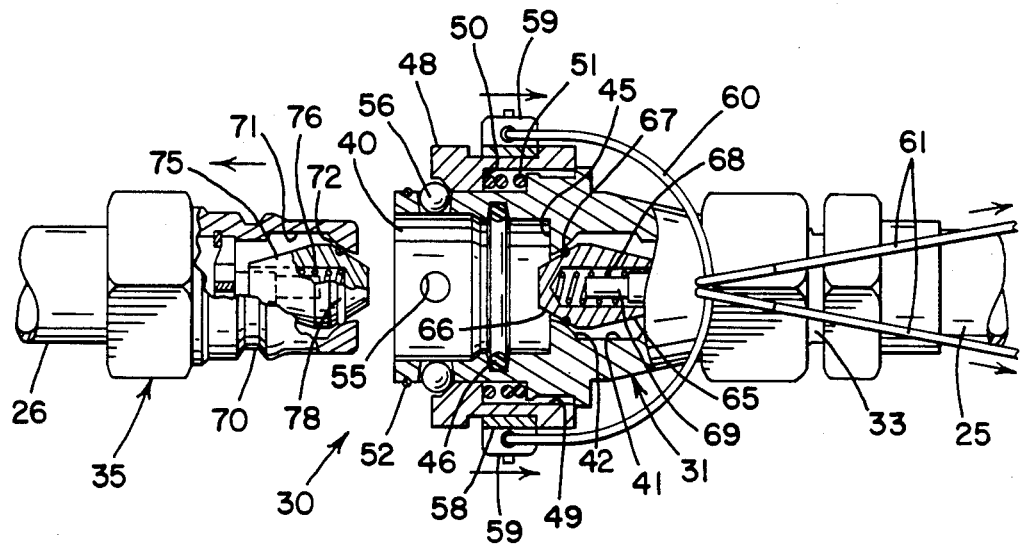
FIG. 5 is a cross sectional view of the quick disconnect coupling means of FIG. 4 in a disconnect and inoperative condition.

Plug 35 has a cylindrical outer surface with an annular groove 70 which is adapted to receive steel backing balls 56 as depicted by FIG. 4. Plug 35 stepped internal bore 71 communicating with hose 26. The forward portion of bore 71 has a radially inwardly tapering frusto-conical bore portion 72, defining a valve seat 72, that is adapted to receive a valve 75 biased by a spring 76 into sealing engagement with valve seat 72. Such valve 75 has an annular seal 78 that insures a sealing engagement of such valve on valve seat 72 to stop the flow of any pressurized fluid from hose 26. Thus as viewed in FIG. 5, the respective valves 75 and 65 seal the respective hoses 26 and 25 to prevent the escape of pressurized fluid.

Figure 3:
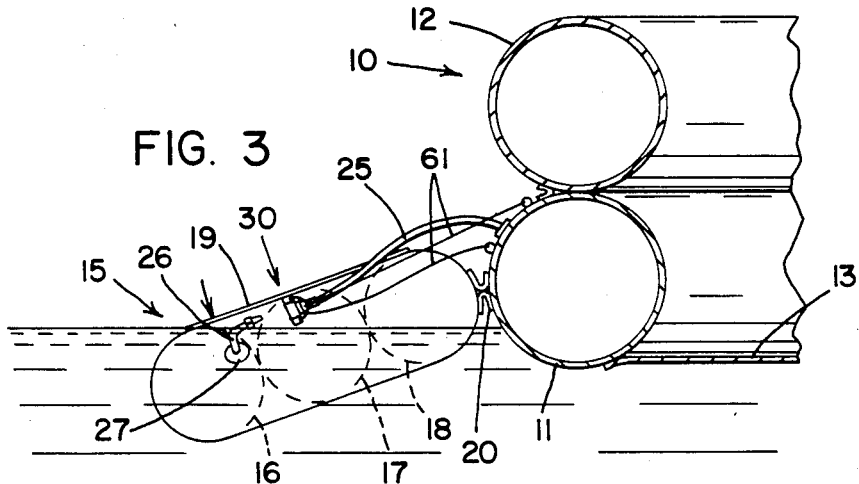
FIG. 3 is a cross sectional view of the raft and boarding ramp similar to FIG. 2 but showing the boarding ramp under a load on its forwardly disposed portion.

In engaging plug 35 with the socket 31, sleeve 48 is moved rightwardly as viewed in FIG. 5 while plug 35 is moved into enlarged bore portion 40 until the balls 56 enter the annular groove 70 such that release of sleeve 48 moves over the balls 56 and maintained thereover by the biasing action of spring 51. During this action, the respective valves 75 and 65 engage each other and compress their respective springs 76 and 68 such that the respective valves unseat from valve seats 72 and 42 respectively to allow the flow of pressurized air from hose 25 to the hose 26 which in effect allows the pressurization of ramp 15 from the chambers as defined by tubes 11. By selecting the correct length of lines 61—61, the flow of air between tubes 11 and the chamber of ramp 15 can be interrupted after the chamber of ramp 15 has filled out as when the ramp 15 is pulled downward as when boarding as depicted by FIG. 3 by the pulling of sleeve 58 towards the raft by lines 61 which unlocks the socket from the plug 35 and they assume the position as depicted by FIG. 5. This action insures that respective ramp chamber and the chamber of raft tube 11 remain distinct and independent thereafter.

By shortening the tension lines or cords 61—61 in the example described above, the coupling 30 will disconnect when the ramp 15 is completely filled out by inflation or when the fabric of the ramp is stretched due to inflation pressure causing the ramp 15 to move further away from the raft 10 which causes the tension member or tension cords 61—61 to slide back the sleeve 58 and thus disconnect coupling 30. The hose 25 should be in a slack condition or slightly longer than the tensioning member so as not to carry any of the tension.

Once the raft chamber has inflated the ramp chamber, there is no reason to keep them connected because a failure in one can result in the other losing pressure. The above described structures isolates the respective raft chamber from the tube chamber at a predetermined time so failure in one eliminates loss of pressure in the other.

A modification of the above described invention is to have a quick disconnect coupling 30' interconnecting a container or bottle of compressed gas 80 via hose 81 to a hose 82, which hose 72 is in turn connected to one of the inflatable tubes 12. As in the first described embodiment, a tension member or tension line 85 interconnects the quick disconnect coupling 30' to the raft to provide sufficient tension under inflation such that the tension member 85 will be operative to separate the bottle of compressed gas from the raft tube 12 in rough sea conditions. Under these conditions the quick disconnect coupling 30' would separate hoses 81 and 82 before the relatively heavy bottle tore any attachment fittings of hose 82 out of the tube 12, the main buoyancy chambers, thus retaining the raft in a fully inflated condition.

Various modifications are contemplated and may obviously be resorted to by those skilled in the art without departing from the described invention, as hereinafter defined by the appended claims as only a preferred embodiment thereof has been disclosed.

I claim:

1. An inflatable life raft comprising a plurality of inflatable tubes forming the sides of a boat like structure upon inflation, said tubes defining a first inflatable chamber, a flexible impermeable floor united to said inflatable tubes for cooperation with said inflatable tubes to form a boat like structure, an inflatable ramp attached to said tubes to accommodate the ingress into said boat like structure from water surrounding said raft, said ramp defining a second chamber, a first hose attached to one of said tubes for communicating with said first chamber, a second hose having one end attached to said ramp for communicating with said second chamber, quick disconnect shut-off means interconnecting said first hose to said second hose for intercommunicating said first chamber to said second chamber, a tension member interconnected between said raft and said quick disconnect shut-off means and being operative to actuate said disconnect shut-off means to isolate said chambers to prevent flow of pressurized air between said chambers through their respective hoses in response to a preset distance between said quick disconnect means and said raft being exceeded.

2. An inflatable life raft as set forth in claim 1 wherein said quick disconnect means includes a plug on said second hose and a socket on said first hose, said socket being operative to receive said plug to intercommunicate said hose and said chambers in a connected condition, and said plug spaced from said socket to define a disconnected condition and being operative to isolate said chambers.

3. An inflatable life raft as set forth in claim 2 wherein said plug and said socket each have a valve member operative to abut each other upon being in said connected condition to provide intercommunication between said chambers.

4. An inflatable life raft as set forth in claim 3 wherein said valve members are operative to block the flow of any pressurized air from the respective chambers upon said plug and said socket being in a disconnected condition.

5. An inflatable life raft as set forth in claim 4 wherein said tension member is a flexible line having one end attached to said quick disconnect means and having the other end attached to said raft.

6. An inflatable life raft as set forth in claim 5 wherein said quick disconnect means has a locking mechanism for maintaining said plug and said socket in engaged and connected condition, a sleeve member on said quick disconnect means being biased to retain said locking mechanism engaged, and said tension member having said one end attached to said sleeve to bias said sleeve to release said locking mechanism which releases said plug from said socket to make said valve members operative to block the flow of pressurized air from said respective chambers.

7. An inflatable life raft comprising a plurality of inflatable tubes forming the sides of a boat like structure, a floor member having its periphery connected to said inflatable tubes to form a boat like structure, said tubes defining a first chamber, an inflatable ramp connected to said tubes to provide ingress onto said raft, said inflatable ramp defining a second chamber, a hose connected to each of said chambers, a quick disconnect means interconnecting said hoses, said quick disconnect means having valve means operative in its connected condition to maintain an unobstructed passageway between said chambers, said valve means of said quick disconnect means operative in a disconnected condition to completely obstruct and block the passageway in each of said hoses to prevent deflation of chambers connected thereto, a tension member interconnected between said quick disconnect means and said raft, and said tension member operative in an untensioned condition to maintain said valve means of said quick disconnect means in said connected condition while operative in a predetermined tensioned condition to place said valve means of said quick disconnect means in a disconnected condition and thereby place said chambers in an uncommunicated condition.

8. An inflatable life raft as set forth in claim 7 wherein said valve means includes a coupling having a socket member and a plug member wherein said socket member is operative to receive said plug member in an operative condition to maintain said passageway unobstructed and having said socket member disconnected from said plug member in a disconnected condition to completely obstruct and block said passageway in each of said hoses.

9. An inflatable life raft comprising a plurality of inflatable tubes forming the sides of a boat like structure upon inflation, said tubes defining a first inflatable chamber, a flexible impermeable floor united to said inflatable tubes for cooperation with said inflatable tubes to form a boat-like structure, a cylinder attached to said tubes, said cylinder having pressurized gasses therein defining a second chamber, a first hose attached to one of said tubes for communicating with said first chamber, a second hose having one end attached to said cylinder for communicating with said second chamber, quick disconnect shut-off means interconnecting said first hose to said second hose for intercommunicating said first chamber to said second chamber, a tension member interconnected between said raft and said quick disconnect shut-off means and being operative to actuate said disconnect shut-off means to isolate said chambers to prevent flow of pressurized air between said chambers through their respective hoses in response to a preset distance between said quick disconnect means and said raft being exceeded.

10. An inflatable life raft as set forth in claim 9 wherein said quick disconnect means includes a plug on said second hose and a socket on said first hose, said socket being operative to receive said plug to intercommunicate said hose and said chambers in a connected condition, and said plug spaced from said socket to define a disconnected condition and being operative to isolate said chambers.

11. An inflatable life raft as set forth in claim 9 wherein said plug and said socket each have a valve member operative to abut each other upon being in said connected condition to provide intercommunication between said chambers, and operative to block the flow of any pressurized air from the respective chambers upon said plug and said socket being in a disconnected condition.

* * * * *